(12) United States Patent
Gill et al.

(10) Patent No.: US 11,288,574 B2
(45) Date of Patent: Mar. 29, 2022

(54) SYSTEMS AND METHODS FOR BUILDING AND UTILIZING ARTIFICIAL INTELLIGENCE THAT MODELS HUMAN MEMORY

(71) Applicant: Microsoft Technology Licensing, LLC., Redmond, WA (US)

(72) Inventors: Deepinder S. Gill, Hyderabad (IN); Vipindeep Vangala, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 588 days.

(21) Appl. No.: 15/299,145

(22) Filed: Oct. 20, 2016

(65) Prior Publication Data

US 2018/0114111 A1   Apr. 26, 2018

(51) Int. Cl.
*G06N 3/08*       (2006.01)
*G06N 5/02*       (2006.01)
*G06N 3/00*       (2006.01)

(52) U.S. Cl.
CPC ............... *G06N 3/08* (2013.01); *G06N 3/004* (2013.01); *G06N 3/006* (2013.01); *G06N 5/022* (2013.01)

(58) Field of Classification Search
CPC .......... G06N 3/004; G06N 3/006; G06N 3/08; G06N 5/022; Y04S 10/54
See application file for complete search history.

(56) References Cited

U.S. PATENT DOCUMENTS

| | | | |
|---|---|---|---|
| 8,150,844 B2 | 4/2012 | Redstone et al. | |
| 8,275,399 B2* | 9/2012 | Karmarkar | H04M 1/72547 455/403 |
| 8,756,276 B2 | 6/2014 | Tseng et al. | |
| 8,818,992 B2 | 8/2014 | Punaganti et al. | |
| 8,838,581 B2 | 9/2014 | Tseng | |
| 8,930,191 B2 | 1/2015 | Gruber et al. | |
| 2012/0016678 A1* | 1/2012 | Gruber | G10L 15/22 704/275 |
| 2012/0159326 A1 | 6/2012 | Mital et al. | |
| 2013/0097463 A1 | 4/2013 | Marvasti et al. | |
| 2013/0204813 A1 | 8/2013 | Master et al. | |

(Continued)

FOREIGN PATENT DOCUMENTS

EP   2884409 A1   6/2015

OTHER PUBLICATIONS

"International Search Report and Written Opinion Issued in PCT Application No. PCT/US2017/056700", dated Jan. 26, 2018, 21 Pages.

(Continued)

*Primary Examiner* — Omar F Fernandez Rivas
*Assistant Examiner* — Selene A. Haedi

(57) ABSTRACT

Systems and methods for creating and/or using an artificial intelligence memory system that models human memory are provided. The AI memory system creates and/or uses a user centric memory graph. The user centric memory graph implicitly links memory elements of a user utilizing relationships created in space, time, and cognitive dimensions similar to how the human brain stores and recalls different memory elements. The user centric memory graph is used by searching and/or constraining the user centric memory graph based on a determined user context and/or a user query.

20 Claims, 13 Drawing Sheets

(56) References Cited

U.S. PATENT DOCUMENTS

| | | | |
|---|---|---|---|
| 2013/0275429 A1* | 10/2013 | York | G06F 16/435 |
| | | | 707/737 |
| 2014/0047316 A1 | 2/2014 | Strydom et al. | |
| 2014/0201629 A1 | 7/2014 | Heck | |
| 2014/0280360 A1* | 9/2014 | Webber | G06F 16/9024 |
| | | | 707/798 |
| 2014/0280936 A1* | 9/2014 | Nandagopal | H04L 67/22 |
| | | | 709/225 |
| 2015/0149390 A1 | 5/2015 | Brdiczka et al. | |
| 2015/0293904 A1* | 10/2015 | Roberts | G06F 16/90332 |
| | | | 704/9 |
| 2015/0370787 A1 | 12/2015 | Akbacak et al. | |
| 2016/0170997 A1 | 6/2016 | Chandrasekaran et al. | |
| 2017/0091662 A1* | 3/2017 | Sanchez | G06F 16/2465 |
| 2021/0026859 A1 | 1/2021 | Vangala et al. | |

OTHER PUBLICATIONS

Li, et al., "Personal Knowledge Graph Population From User Utterances In Conversational Understanding", In IEEE Spoken Language Technology Workshop, Dec. 7, 2014, pp. 224-229.

Purcher, Jack, "Apple introduces US to Siri, the Killer Patent", Published on: Jan. 19, 2012 Available: at http://www.patentlyapple.com/patently-apple/2012/01/apple-introduces-us-to-siri-the-killer-patent.html, 26 pages.

Rosenblatt, Gideon, "Six Building Blocks for a Virtual Personal Assistant", Published on: Oct. 4, 2015 Available at: http://www.the-vital-edge.com/virtual-personal-assistant/, 11 pages.

"GCA (General Conversational Agent)", Published on: Dec. 7, 2015 Available at: http://aibrain.com/solutions/gca-general-conversational-agent/, 3 pages.

* cited by examiner

Mobile Computing Device

SYSTEMS AND METHODS FOR BUILDING AND UTILIZING ARTIFICIAL INTELLIGENCE THAT MODELS HUMAN MEMORY

BACKGROUND

Language understanding systems, personal digital assistants, agents and artificial intelligence (AI) are changing the way users interact with the computers. Developers of computers, web services, and/or applications are always trying to improve the interactions between humans and computers. The language understanding systems, personal digital assistants, agents and artificial intelligence are typically utilized to communicate with user and/or to complete basic tasks.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to an artificial intelligence (AI) memory system and/or method that builds and/or utilizes a user centric knowledge graph that models the memory system of the human brain for an application. The user centric knowledge graph models the memory system of the human brain by linking memory elements from collected user signal based on relationships in the space, time and/or cognitive dimensions of the user. The ability of the AI memory system and/or method to create and/or use an AI that models human memory improves a user's ability to accomplish tasks, improves the recall of needed memory items, improves the usability, improves the performance, and/or improves user interactions of/with an application when compared to previously utilized applications that do not model human memory and/or that are not user centric.

One aspect of the disclosure is directed to building and using an artificial intelligence memory system that models human memory. The system includes at least one processor and a memory. The memory encodes computer executable instruction that, when executed by the at least one processor, are operative to:
  collect user signals that include memory elements from a user;
  enrich the memory elements with world knowledge to form enriched elements;
  create a user centric memory graph by linking the enriched elements based on relationships created in space, time, and cognitive dimensions;
  store the user centric memory graph;
  determine a user context based on the enriched elements;
  identify relevant elements on the user centric memory graph based on the user context to form a contextually constrained memory graph;
  rank the relevant elements on the contextually constrained memory graph based on the user context to form ranked elements;
  determine a response based the contextually constrained memory graph and the ranked elements;
  compare the response to a relevancy threshold;
  determine that the response meets the relevancy threshold based on the comparison; and
  provide the response to the user upon making the determination that the response meets the relevancy threshold.

Another aspect of the disclosure is directed to a system with a platform for building an artificial intelligence memory system that models human memory for an application. The system includes at least one processor and a memory. The memory encodes computer executable instruction that, when executed by the at least one processor, are operative to:
  collect user signals that include a first set of memory elements and digital artifacts;
  convert the digital artifacts into a second set of memory elements utilizing world knowledge;
  enrich the first set of memory elements and the second set of memory elements with the world knowledge to form enriched elements;
  create a user centric memory graph by linking the enriched elements based on relationships created in space, time, and cognitive dimensions utilizing machine learning and statistical modeling techniques; and
  store the user centric memory graph.
The application is configured to utilize the user centric memory graph to provide unrequested memory prompts and to provide responses to received user queries.

Yet another aspect of the disclosure includes a method for using an artificial intelligence memory system that models human memory. The method includes:
  collecting user signals that include digital artifacts;
  converting the digital artifacts into memory elements utilizing world knowledge;
  enriching the memory elements with the world knowledge to form enriched elements;
  updating a user centric memory graph by linking the enriched elements based on relationships created in space, time, and cognitive dimensions utilizing machine learning and statistical modeling techniques to form an updated user centric memory graph;
  storing the updated user centric memory graph;
  determining a first user context based on the enriched elements;
  identifying relevant elements on the updated user centric memory graph based on the first user context;
  forming a contextually constrained memory graph based on the relevant elements;
  ranking the relevant elements on the contextually constrained memory graph based on the first user context to form ranked elements utilizing a ranking algorithm;
  determining an unrequested memory prompt based on the contextually constrained memory graph and the ranked elements;
  comparing the unrequested memory prompt to a relevancy threshold;
  determining that the unrequested memory prompt meets the relevancy threshold based on the comparing; and
  in response to the determining that the unrequested memory prompt meets the relevancy threshold, providing the unrequested memory prompt to a client computing device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Progress in machine learning, language understanding and artificial intelligence are changing the way users interact with the computers. Digital assistant applications, such as SIRI®, GOOGLE® NOW™ and CORTANA® are examples of the shift in human computer interaction.

Currently, language understanding systems, personal digital assistants, agents and artificial intelligence are utilized to communicate with user and/or to complete basic tasks. While these previously utilized systems can help track individual snippets of information, these previously utilized systems cannot take all of the known user memory elements and seamlessly link them utilizing time, space and cognitive elements of the user like the human brain. As such, these previously utilized systems had limited recall, only snippet specific recall, and/or graphs that were not user centric.

Therefore, systems and methods for creating and/or using an artificial intelligence memory system that models the human brain to augment human memory are disclosed herein. The systems and methods for creating and/or using an artificial intelligence that models human memory is based on the creation and/or use of a user centric memory graph. The user centric memory graph is created by implicitly linking memory elements of a user utilizing relationships created in space, time, and cognitive dimensions of the user similar to how the human brain stores and recalls different memory elements. The user centric memory graph is used by searching or constraining the user centric memory graph based on a determined user context and/or a user query. The ability of the systems and methods described herein to create and use an AI that models the memory recall of the human brain improves a user's ability to accomplish tasks, improves the recall of needed memory items, improves the usability, improves the performance, and/or improves user interactions of/with an application when compared to previously utilized applications that do not model the memory recall of the human brain or utilize user centric graphs.

Figure 1A:
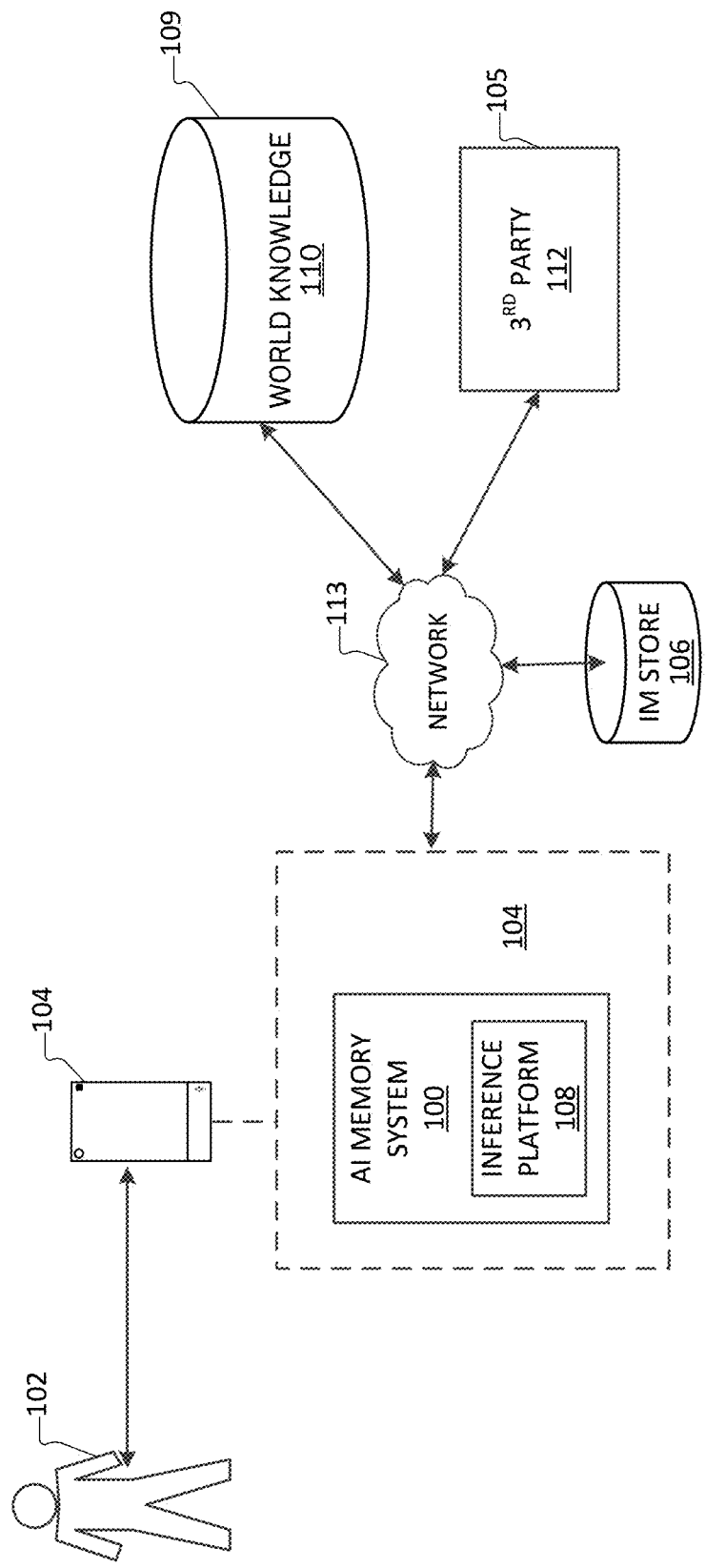
FIG. 1A is a schematic diagram illustrating an AI memory system on a client computing device, in accordance with aspects of the disclosure.
Figure 1B:
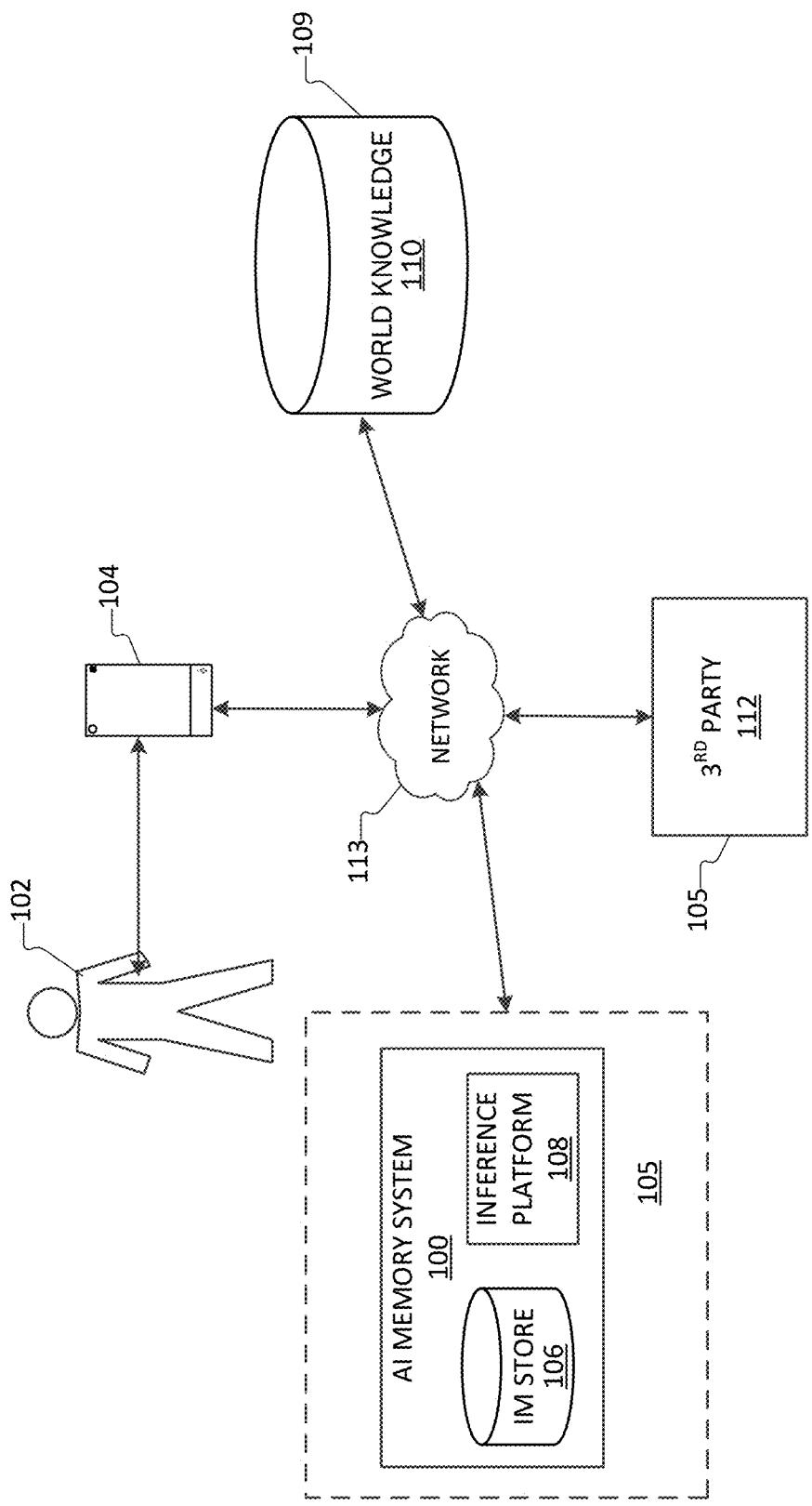
FIG. 1B is a schematic diagram illustrating an AI memory system on a server computing device being utilized by a user via a client computing device, in accordance with aspects of the disclosure.

FIGS. 1A and 1B illustrate different examples of an AI memory system 100 that models the human brain on a client computing device 104 being utilized by a user 102, in accordance with aspects of the disclosure. The AI memory system 100 is a system for building and using artificial intelligence that models human memory. The AI memory system 100 includes an inference platform 108 for building and using a user centric memory graph. The user centric memory graph implicitly links memory elements of the user 102 utilizing relationships created in space, time, and cognitive dimensions of the user similar to how the human brain stores and recalls different memory elements. In contrast, previously utilized AI systems or digital assistants did not maintain a graph a user's memory elements and/or did not structure any knowledge graphs based on the user and/or based on relationships created in space, time, and cognitive dimensions of the user.

The AI memory system 100 may also include a persistent store 106 (also referred to herein as IM store 106) for storing the user centric memory graph. In alternative aspects, the IM store 106 is stored on a database 109, including world knowledge 110, separate and distinct from the AI memory system 100. In further aspects, the user centric memory graph is stored on an IM store 106 in the AI memory system 100 and in a database 109 separate and distinct from the AI memory system 100.

In some aspects, the AI memory system 100 is implemented on the client computing device 104 as illustrated in FIG. 1A. In a basic configuration, the client computing device 104 is a computer having both input elements and output elements. The client computing device 104 may be any suitable computing device for implementing the AI memory system 100. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing the AI memory system 100 may be utilized.

In other aspects, the AI memory system 100 is implemented on a server computing device 105, as illustrated in FIG. 1B. The server computing device 105 may provide data to and/or receive data from the client computing device 104 through a network 113. In some aspects, the network 113 is a distributed computing network, such as the internet. In further aspects, that AI memory system 100 is implemented on more than one server computing device 105, such as a plurality or network of server computing devices 105. In some aspects, the AI memory system 100 is a hybrid system with portions of the AI memory system 100 on the client computing device 104 and with portions of the AI memory system 100 on the server computing device 105.

Figure 2:
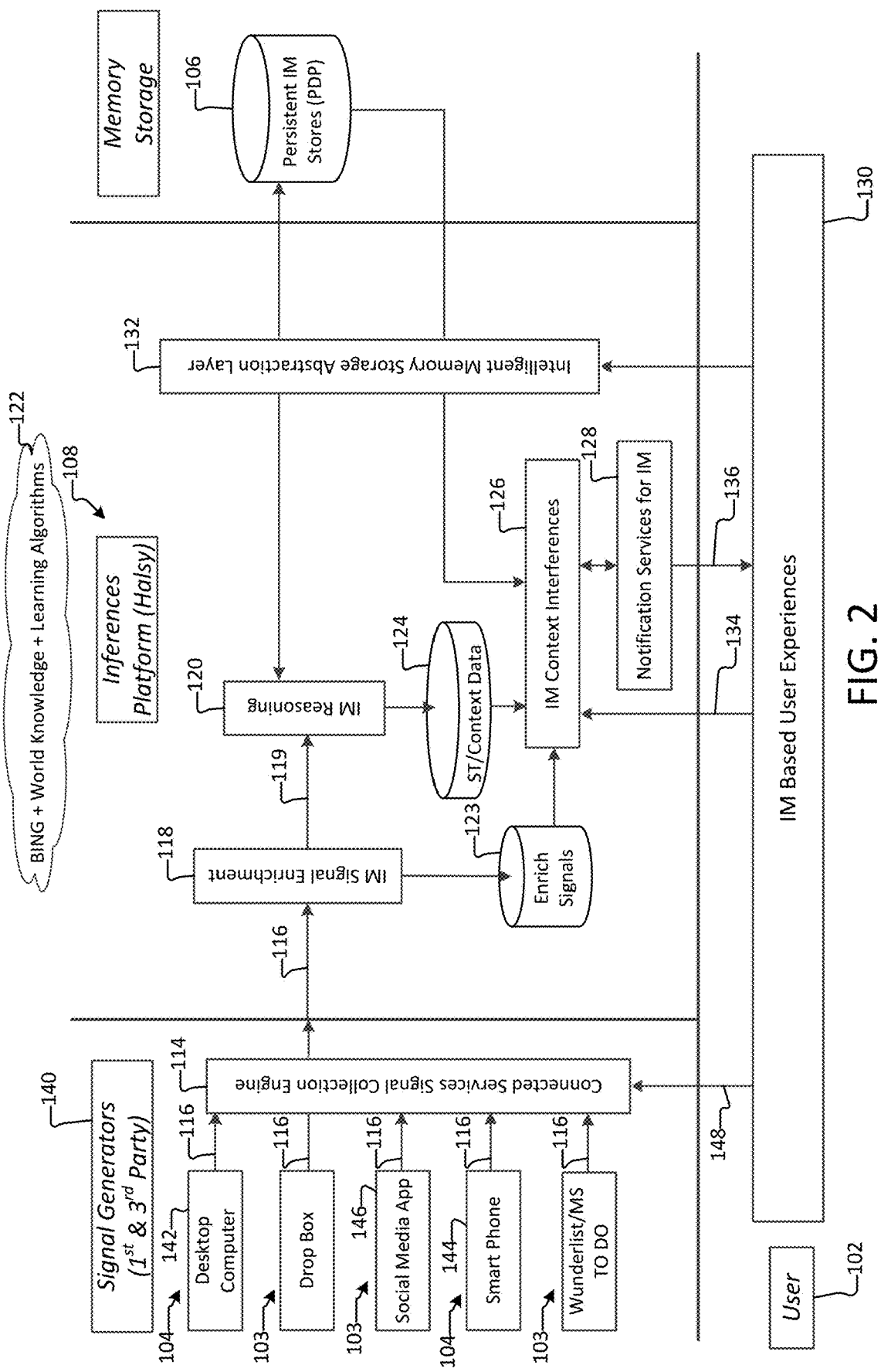
FIG. 2 is a simplified schematic block diagram illustrating the building and use of a user centric memory graph by an AI memory system, in accordance with aspects of the disclosure.

FIG. 2 is an example of a simplified schematic block diagram illustrating the building and use of a user centric memory graph by an AI memory system 100, in accordance with aspects of the disclosure. As discussed above and as shown in FIG. 2, the AI memory system 100 includes an inference platform 108. The inference platform 108 of the AI memory system 100 collects user signals 116. The term collect as utilized herein refers the active retrieval of items and/or to the passive receiving of items. The user signals 116 are specific to and relate to a given user 102.

The user signals 116 are produced by signal generators 140. The signal generators 140 may first party signal generators and/or third party signal generators. First party signal generators are devices 104 owned by the user 102 and/or applications run on the user's devices 104. For example, first party client device include a user's desktop computer 142 and/or a user's smart phone 144. In further examples, application run by the user that send user signals 116 may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, photo application, mapping application, an e-business application, a transactional application, an exchange application, a device control application, a web interface application, a calendaring application, etc. The user signals 116 may also include user queries requested by a user 102 via a client device 104.

Third party signal generators are devices 104 owned by and/or applications 103 run by third parties 112 but communicatively coupled to the AI memory system 100. However, only signals related to the user 102 are collected from the third party signal generators. For example, a friend of the user 102 may post content that relates to the user on a social media application 146. While this content is generated by a third party 112 on an application being run by a third party 112, this data relates to the user 102 and is accessible by the AI memory system 100. As such, this social network content may be collected by the AI memory system 100 as a user signal 116.

In some aspects, a signal collection engine 114 separate and distinct from the AI memory system 100 may be utilized to gather the user signals 116. In these aspects, the signal collection engine 114 may send the user signals 116 to the AI memory system 100. In other aspects, the AI memory system 100 collects the user signals directly from the signal generators 140. In these aspects, the signal collection engine 114 may be part of the AI memory system 100.

The inference platform 108 of the AI memory system 100 receives the user signals 116. The inference platform 108 includes an enrichment system 118, a reasoning system 120, a context inference system 126, and notification system 128. The inference platform 108 may also include temporary memory 123 and/or a context database 124. In further aspects, the inference platform 108 may also include an abstraction layer system 132.

The enrichment system 118 of the inference platform 108 collects the user signals 116. The user signals 116 include memory elements of the user 102 and/or digital artifacts. The enrichment system 118 converts the digital artifacts into memory elements utilizing world knowledge 122. Additionally, the enrichment system 118 enriches the memory elements utilizing world knowledge 122. World knowledge 122 as utilized herein includes any information that can be accessed utilizing a network connection, such as search engines and databases. For example, a digital artifact, such as GPS coordinates, has no memory value to the user 102. However, upon a search of the world knowledge 122, the enrichment system 118 can determine that these coordinates are for a Starbucks at a specific address in Seattle, Wash. In response to this determination, the enrichment system 118 may convert the digital GPS coordinates into a memory element of "Starbucks" and "Seattle." Further, the enrichment system 118 could search the world knowledge 122 to enrich the "Starbucks" memory element and determine that "Starbucks" is a coffee shop. In this embodiment, the enrichment system 118 may enrich the "Starbucks" memory element by tagging this memory element as a "coffee shop." As such, the enrichment system 118 tag memory elements and determine additional memory elements to form enriched memory elements 119 (also referred to as enriched elements 119). In some aspects, the memory elements include a user query. In these aspects, the enriched memory elements may include enriched user query elements.

The enrichment system 118 of the inference platform 108 collects the user signals 116. The user signals 116 include memory elements of the user 102 and/or digital artifacts. The enrichment system 118 converts the digital artifacts into memory elements utilizing world knowledge 122. Additionally, the enrichment system 118 enriches the memory elements utilizing world knowledge 122. World knowledge 122 as utilized herein includes any information that can be accessed utilizing a network connection, such as search engines and databases. For example, a digital artifact, such as GPS coordinates, has no memory value to the user 102. However, upon a search of the world knowledge 122, the enrichment system 118 can determine that these coordinates are for a STARBUCKS® at a specific address in Seattle, Wash. In response to this determination, the enrichment system 118 may convert the digital GPS coordinates into a memory element of "STARBUCKS®" and "Seattle." Further, the enrichment system 118 could search the world knowledge 122 to enrich the "STARBUCKS®" memory element and determine that "STARBUCKS®" is a coffee shop. In this embodiment, the enrichment system 118 may enrich the "STARBUCKS®" memory element by tagging this memory element as a "coffee shop." As such, the enrichment system 118 tag memory elements and determine additional memory elements to form enriched memory elements 119 (also referred to as enriched elements 119). In some aspects, the memory elements include a user query. In these aspects, the enriched memory elements may include enriched user query elements.

In some aspects the user centric memory graph is already formed when the reasoning system 120 receives the enriched memory elements 119. In these aspects, the reasoning system 120 updates the user centric memory graph as needed based on the additional enriched memory elements. The additional enriched elements may contain user signals from first and/or third party generators and may include a user query and/or third party enriched elements. For example, the reasoning system may add enriched memory elements to the graph that are not listed in the user centric memory graph and may update memory elements that are already present on the memory graph based on new relationships created in space, time, and cognitive dimensions upon receipt of additional enriched elements again. The updated user centric memory graph is sent by the reasoning system 120 to persistent store 106 and/or context database 124 for storage. The outdated user centric memory graph may be deleted or retained by the persistent store 106. The outdated user centric memory graph is deleted from the context database 124. In some aspects, the reasoning system 120 collects the user centric memory graph from the persistent store 106 for updating. The AI memory system 100 and/or the context inference system 126 of the AI memory system 100 utilize the most up-to-date user centric memory graph to determine responses and/or user context.

In further aspects, the reasoning system 120 monitors the enriched elements 119 to determine user patterns. For example, if the user 102 checks the weather every morning, the reasoning system 120 can determine that weather information is desired in the morning as a user pattern. In another example, if the user usually buys flowers for mother's day, the reasoning system 120 may determine that a flower purchase is desired for mother's day. The reasoning system 120 may update the user centric memory graph and/or may update the machine learning techniques and/or statistical modeling techniques based on a determined pattern.

Additionally, the reasoning system 120 may utilize the determined enriched signals and the current user centric memory graph to determine user context or the current state of the user 102. The current state or user context is based on the current location of the user, the current time, current weather, the current digital behavior of the user, and/or current user physical activity. In some aspects, the user context may include a requested user query. Each of these contextual elements may be determined by the reasoning system 120 from the determined enriched signals and the current user centric memory graph. Additionally, the reasoning system 120 may utilize machine learning techniques and/or statistical modeling techniques to determine the user context. Further, the reasoning system 120 may link or associate determined user patterns with one or more specific user context to improve user context determinations. In some aspects, the user context is determined from recently formed enriched elements 119. In further aspects, the recently received enriched elements are stored on the temporary store 123 and may be collected therefrom.

Once the user context is determined, the reasoning system 120 may send the current user context to the context database 124 for storage. In some aspects, any user context stored on the context database 124 is deleted in response to the receipt of a new or updated user context. In other aspects, once the user context is determined, the reasoning system 120 sends the current user context to the context inference system 126. The reasoning system 120 monitors the recently received enriched memory elements 119 to determine if the user context needs to be updated or changed. For example, a user context may be updated in response to a change in location, a change in current weather, a change in time, a change in digital behavior, a requested user query, and/or a change in physical behavior.

As discussed above, the context inference system 126 collects the user context from the context database 124 and/or the reasoning system 120. The context inference system 126 also collets the user centric memory graph from the persistent store 106, context database 124, and/or the reasoning system 120. The context inference system 126 compares the current user context to the user centric memory graph and determines any connections or nodes that match the current user context. The matched nodes and/or relationships are referred to herein as relevant elements. The context inference system 126 constrains the user centric memory graph based on the relevant elements (matched nodes and connections) to form a contextually constrained memory graph.

Next, the context inference system 126 ranks all of the elements in the constrained memory graph. The context inference system 126 may utilize a ranking algorithm to rank the relevant elements based on the user context. In some aspects, the ranking algorithm is collected from the world knowledge 122. In further aspects, the ranking may be based on a received user query, user pattern, and/or third party provided feedback and/or enriched elements in the user context. The context inference system 126 determines one or more responses based on the constrained memory graph and/or the ranked relevant elements.

The response is any action that the context inference system 126 determines is relevant or may be desired by the user 102 given the user context. As discussed above, the user context includes received user requests and/or queries. Accordingly, the response may be an answer to the user query 134 or performance of a requested task or action based on the user query. The response may also include a question to the user 102. For example, if the user input includes a request to find my car rental rewards number, the response may be "for HERTZ® or ENTERPRISE®?". The response may also include unrequested memory prompts. An unrequested memory prompt provides information and/or recommendations to the user even though the information and/or recommendation was not requested by the user 102. A requested memory prompt provides information and/or a recommendation to the user 102 that was requested by the user 102. As discussed above, the unrequested memory prompt is any information and/or recommendations that the context inference system 126 determines is relevant or may be desired by the user 102 given the user context. For example, the response may include a prompt and/or recommendation to provide weather information, to provide coupon codes, to remind the user of a meeting, to create a calendar event, to send a text message, to set a reminder, to perform a query using a search engine (e.g., BING®, GOOGLE®, YAHOO®), and the like.

The notification system 128 collects the determined recommendations from the context inference system 126. The notification system 128 determines whether or not to send one or more responses to the user 102 given the current context. The notification system 128 compares each response to a relevancy threshold. If the notification system 128 determines that a response meets the relevancy threshold, the response is provided to the user 102. If the notification system 128 determines that a response does not meet the relevancy threshold, the response is not provided to the user 102. In some aspects, if a response is based on a user query, the notification system 128 may automatically determine that the response is relevant to the user. In other aspects, responses based on a user query 134 still have to meet the relevancy threshold before they are provided to the user. For example, the relevancy threshold may be a certain number of connections on the graph or may be rank above a mean rank score.

Once the notification system 128 has determined to provide the response to the user 102, the response 136 is provided for delivery to user 102. The response may be provided to one or more client computing devices 104 for delivery to the user 102. The client computing device 104 delivers the response to the user. In some aspects, the response 136 is instructions to perform a given task or action. In some aspects, the response 136 is automatically performed by the client computing device 104. In other aspects, the response 136 is sent from a server computing device 105 to one or more client computing devices 104 as instructions for performance by the client computing devices 104. In some aspects, the response is converted into phrases, words, and/or terms. The response 136 may be provided to the user 102 via any known output method, such as audio, visual, and tactile. For example, an unrequested prompt may be displayed by a client computing device 104.

As discussed above, the enriched elements 119 are graphed based on relationships created in the space, time, and cognitive dimensions of a user. As such, determined responses mimic or model the responses that the human brain would provide given the user context.

The ability of the AI memory system 100 to create and use an AI that models human memory provides a user experience 130 that improves a user's ability to accomplish tasks, improves the recall of needed memory items, improves the usability, improves the performance, and/or improves user interactions of/with an application when compared to previously utilized applications with AI technology that do not model human memory. Additionally, the ability of the AI memory system 100 to provide responses to the user 102 according to the user context modeled on the human memory system allows the AI memory system 100 to provide a user experience 130 that is more thoughtful and/or more relevant to the user when compared to previously utilized digital assistants or other AI technologies that are not graphed to model the human memory system.

In some aspects, the AI memory system 100 collects user feedback 148 to displayed responses 136. The feedback may be explicit or implicit from the user 102. Explicit feedback is when the user provides comments on a provided response. For example, the user 102 may select or input a request not to provide a given response ever again or may select or input that the user liked a provided response. In contrast, implicit feedback is the monitoring of user behavior in response to a provided response. For example, the selection/non-selection, the duration of use, and/or the pattern of use of provided responses may be monitored to determine user feedback 148. The user feedback 148 is collected as a user signal 116. The feedback 148 is processed by the inference platform similarly to the other user signals 116. As such, the feedback 148 may be utilized to update the user centric memory graph and/or to determine user context. Further, the feedback 148 may be utilized to update or train machine learning and statistical modeling techniques. In some aspects, the AI memory system 100 does not collect any feedback 148 regarding a given response. In these instances, no new user signals 116 relating to user feedback are collected.

As discussed above, in some aspects, the AI system also includes an abstraction layer system 132. The abstraction layer system 132 collects the user centric memory graph, the user context, the constrained memory graph, and/or responses provided to the user 102 and adds a query model on top of these graphs and/or items to form contextual memory data. In some aspects, the AI memory system 100 sends the contextual memory data to one or more third parties. The third parties may utilized this data for their own purposes/consumption, provide feedback back to the AI memory system 100, and/or enrich the provided memory data and send the enrich memory data back to the AI memory system 100. This third party feedback and/or enriched memory data is received by the AI memory system 100 as a user signal 116 from a third party signal generator. If the third party does not send any feedback and/or enriched memory data, then the AI memory system 100 does not receive any additional user signals 116 in this instance from this third party.

Figure 3A:
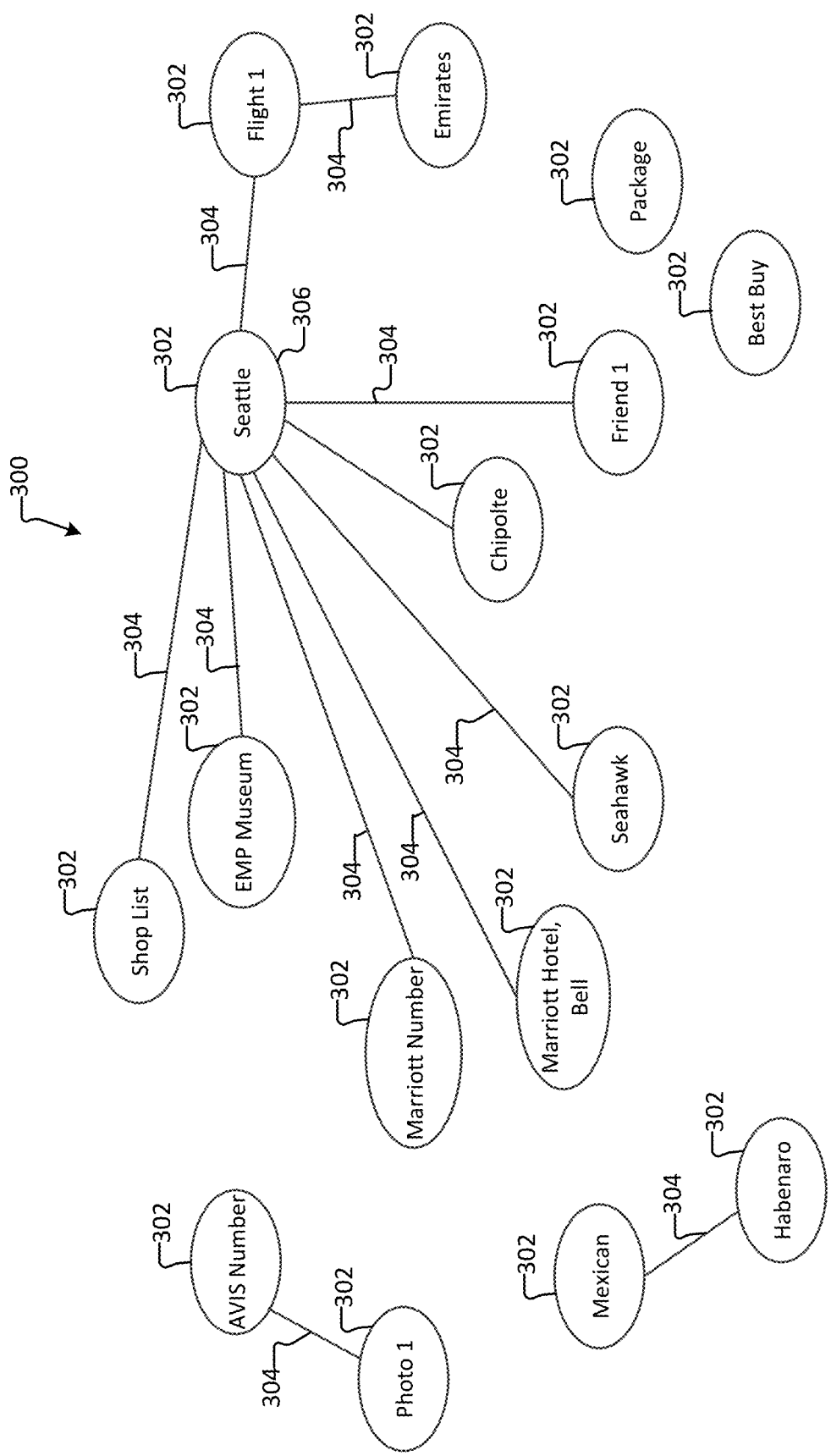
FIG. 3A is a simplified schematic diagram illustrating a user centric memory graph, in accordance with aspects of the disclosure.

FIG. 3A is a simplified schematic diagram illustrating a user centric memory graph 300, in accordance with aspects of the disclosure. The user centric memory graph 300 includes nodes 302 which are linked 304 to other nodes 302 based on relationships in time, space, and the cognitive dimensions. As discussed above, the nodes 302, links 304 and relationships are all user centric or related specifically to a given user. For example, the links 304 are based on spatial relationships of memory elements to the city of Seattle 306 for the user.

Figure 3B:
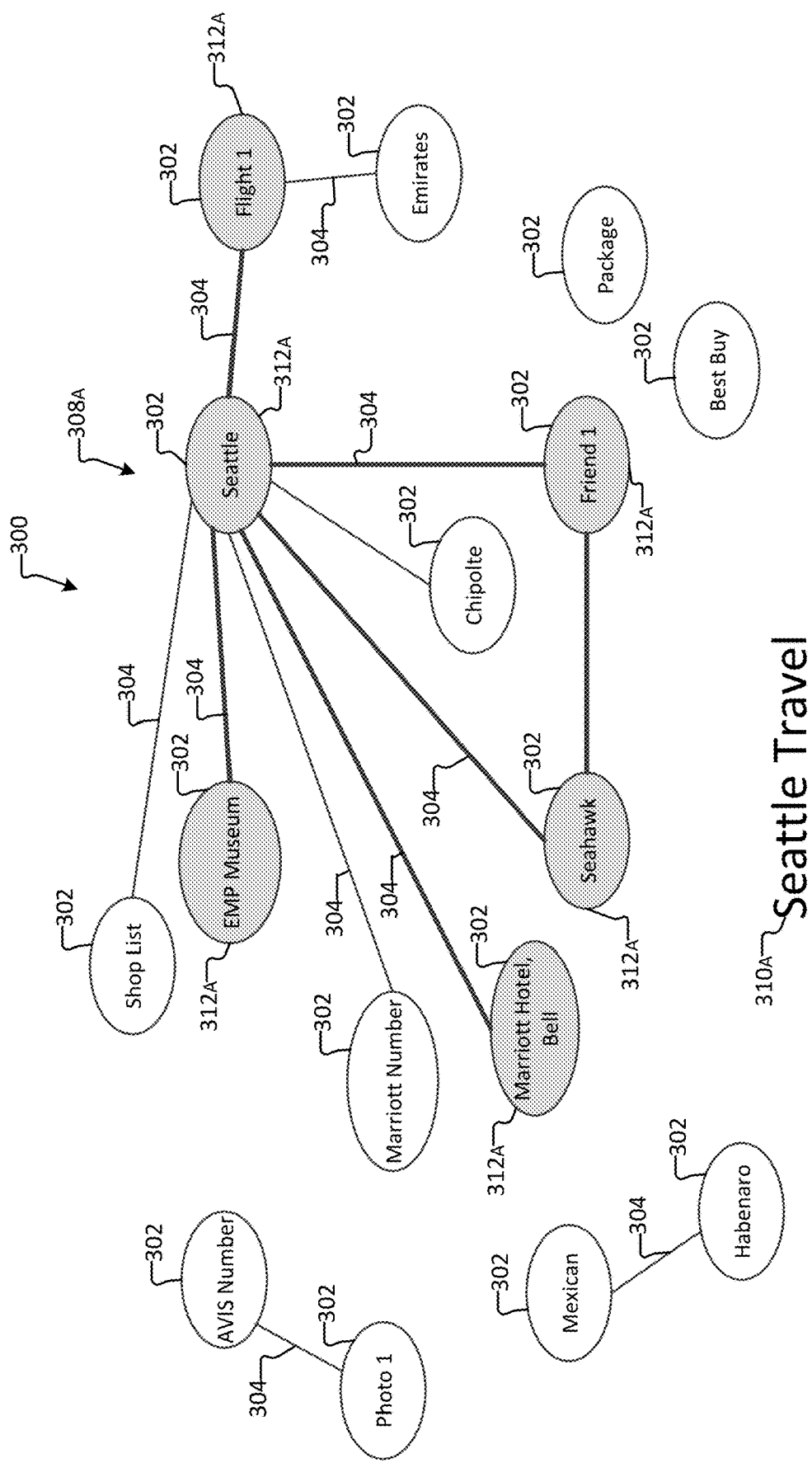
FIG. 3B is a simplified schematic diagram illustrating the user centric memory graph of FIG. 3A constrained based on a current user context, in accordance with aspects of the disclosure.
Figure 3C:
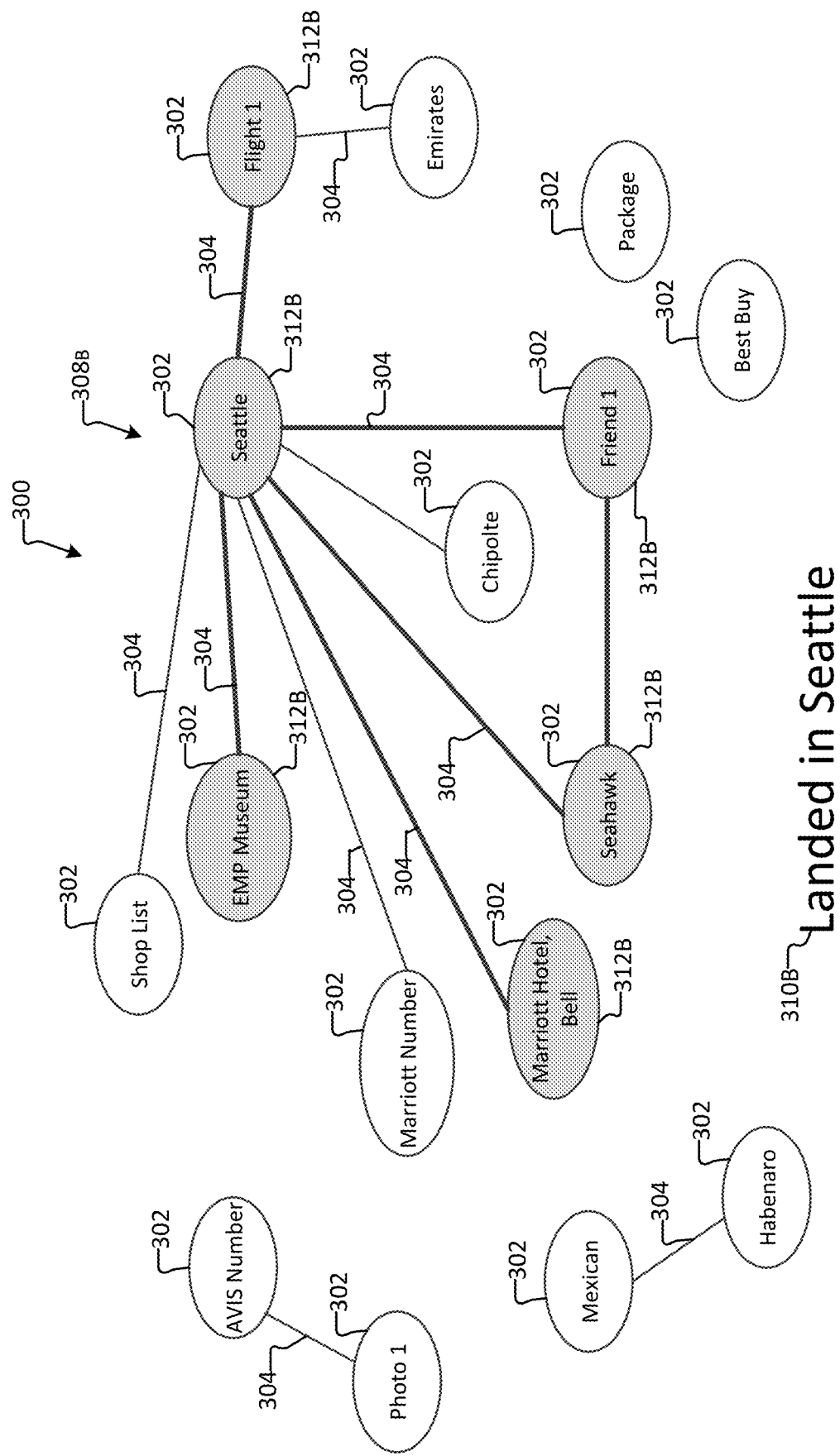
FIG. 3C is a simplified schematic diagram illustrating the user centric memory graph of FIG. 3A constrained based on a current user context, in accordance with aspects of the disclosure.
Figure 3D:
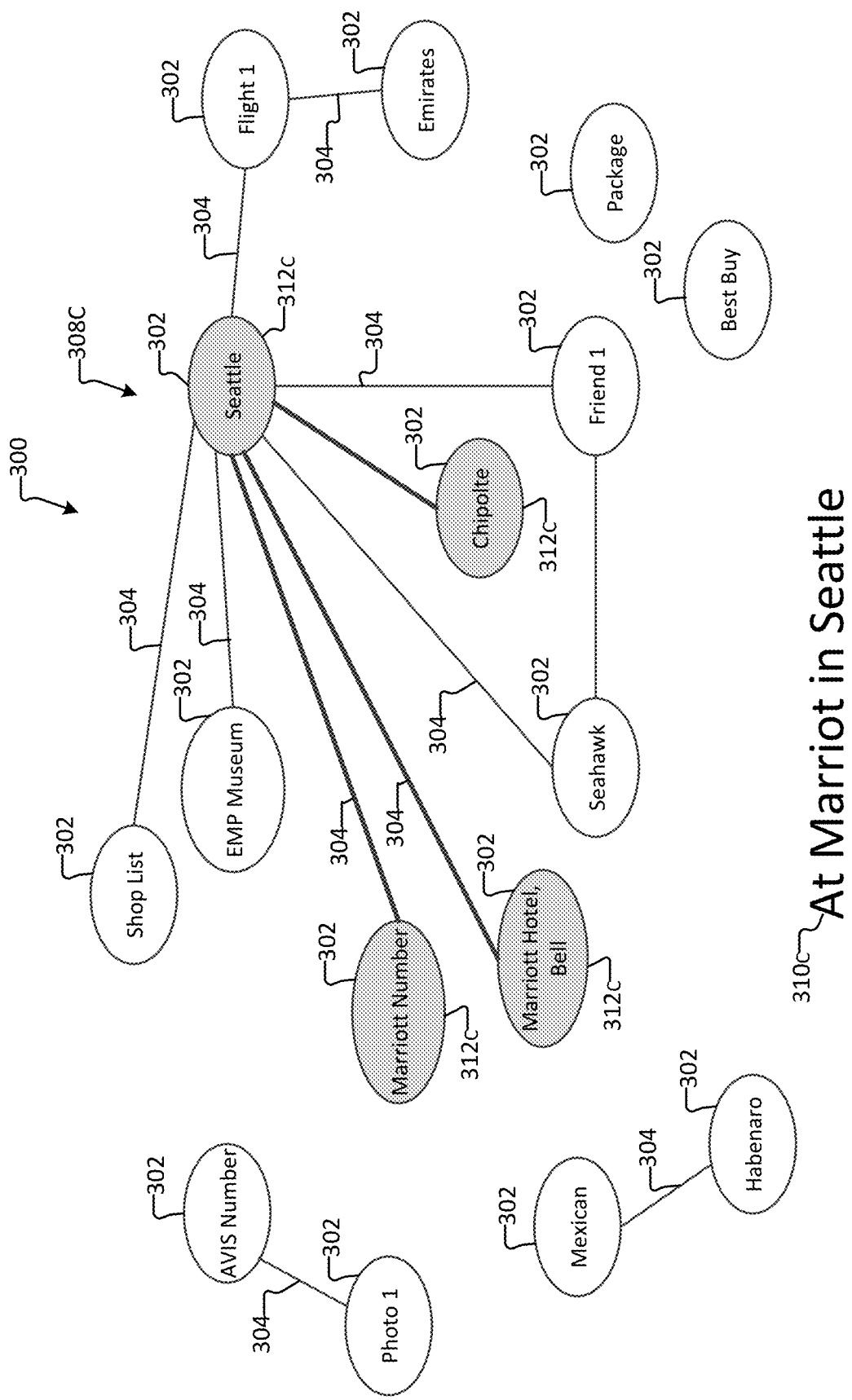
FIG. 3D is a simplified schematic diagram illustrating the user centric memory graph of FIG. 3A constrained based on a current user context, in accordance with aspects of the disclosure.

FIGS. 3B-3D are simplified schematic diagram illustrating the user centric memory graph 300 of FIG. 3A constrained 308 based on different user contexts 310, in accordance with aspects of the disclosure. For example, FIG. 3B illustrates a user context of "Seattle Travel" 310a. Based on this context 310a, relevant memory elements 312a are identified from the user centric memory graph 300 as illustrated in FIG. 3A. These relevant memory elements 312a will be utilized to constrain the user centric memory graph 300 to form a constrained memory graph 308a (as illustrated by the grayed nodes and bolded links). The AI memory system 100 will utilize the constrained memory graph 308a to determine whether or not to provide a response to the user given the user context of "Seattle Travel" 310a.

In another example, FIG. 3C illustrates a user context of "Landed in Seattle" 310b. Based on this context 310b, relevant memory elements 312b are identified from the user centric memory graph 300 as illustrated in FIG. 3A. These relevant memory elements 312b will be utilized to constrain the user centric memory graph 300 to form a constrained memory graph 308b (as illustrated by the grayed nodes and bolded links). The AI memory system 100 will utilize the constrained memory graph 308b to determine whether or not to provide a response to the user given the user context of "Landed in Seattle" 310b.

In yet another example, FIG. 3D illustrates a user context of "At MARRIOTT® in Seattle" 310c. Based on this context 310c, relevant memory elements 312c are identified from the user centric memory graph 300 as illustrated in FIG. 3A. These relevant memory elements 312c will be utilized to constrain the user centric memory graph 300 to form a constrained memory graph 308c (as illustrated by the grayed nodes and bolded links). The AI memory system 100 will utilize the constrained memory graph 308c to determine whether or not to provide a response to the user given the user context of "At MARRIOTT® in Seattle" 310c.

Figure 4:
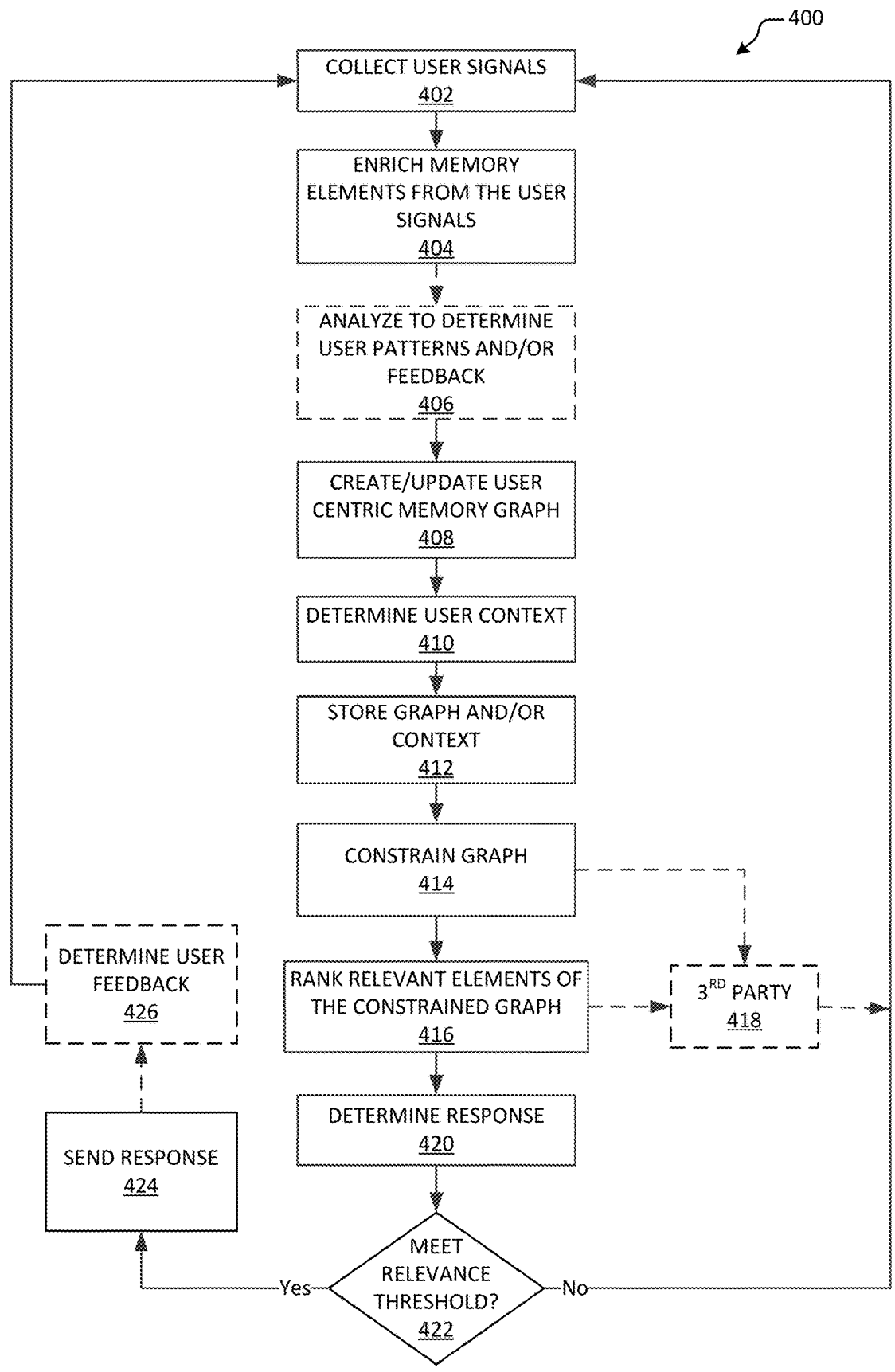
FIG. 4 is a block flow diagram illustrating a method for building and using a user centric memory graph that models human memory that models the human brain, in accordance with aspects of the disclosure.

FIG. 4 illustrates a flow diagram conceptually illustrating an example of a method 400 for building and using artificial intelligence that models human memory. In some aspects, method 400 is performed by the AI memory system 100 as described above. Method 400 provides an application that improves a user's ability to accomplish tasks, improves the recall of needed memory items, improves the usability, improves the performance, and/or improves user interactions of/with an application that utilized AI technology when compared to previously utilized applications with AI technology that did not model the human brain. For example, method 400 may provide information to the user that user need before the user even realizes or remembers that this information is needed, such as reward numbers, coupons, reminder, etc.

Method 400 includes operation 402. At operation 402, user signals are collected. The user signals are collected from first party signal generators and/or third party signal generators. In some aspects, the signal generators are at least one of client devices 104, servers 105, and/or applications. The user signals include memory elements and/or digital artifacts. As utilized herein, digital artifacts. In some aspects, the memory elements and/or digital artifacts in the user signals may include user feedback, third party feedback, third party enrichment, a user query, GPS coordinates, photos, browser history, emails, text messages, social data, one notes, todos, calendar items, professional data, events, and/or application data. As utilized herein, digital artifacts are data that the user would not recognize as a memory element until it is further processed. For example, a digital artifact may include GPS coordinates or computer encoded data.

Next, method 400 includes operation 404. At operation 404, memory elements are enriched with the world knowledge to form enriched elements. In some aspects, at operation 404, digital artifacts in the user signals are converted into memory elements utilizing world knowledge. These memory elements may also be enriched at operation 404 utilizing world knowledge to form the enriched elements.

In some aspects, method 400 includes operation 406. At operation 406 the enriched elements are analyzed to determine user patterns and/or user feedback. In some aspects, operation 406 updates or trains the machine learning techniques and/or statistical modeling techniques based on the determined user feedback and/or user patterns. In additional aspects, the user feedback and/or the user patterns are added to the enriched elements.

After operation 404 and/or 406, operation 408 is performed during method 400. At operation 408, a user centric memory graph is created or updated based on the collected enriched elements. The user centric memory graph is formed at operation 408 by linking the enriched elements based on relationships created in space, time, and cognitive dimensions utilizing machine learning techniques and/or statistical modeling techniques. The user centric memory graph is updated at operation 408 by adding or updating nodes and links based on relationships created in space, time, and cognitive dimensions utilizing machine learning techniques and/or statistical modeling techniques on the already formed user centric memory graph to form an updated user centric memory graph. The updated user centric memory graph replaces the previously determined user centric memory graph. As such, as used herein the "user centric memory graph" may refer to a newly created user centric memory graph or to the most recently updated user centric memory graph. The user centric memory graph is specific to a given user and should only include memory elements that the user could recall from his or her own memory. The forming of relationships based on space, time, and cognitive dimensions at operation 408 models how the human brain recalls memory elements.

Next, operation 410 is performed. At operation 410, a current user context or the current state of the user is determined based on the received set of enriched elements and/or recently received enriched elements. The user context is consistently changing and/or being updated as time passes, the environment changes, user location changes, and/or as user behavior/activity change. As discussed above, the current state of the user or the current user context is based on the current location of the user, the current time, current weather, the current digital behavior of the user, and/or current user physical activity. In some aspects, the user context may include a requested user query. As the enriched elements change so too may the current user context from a first user context to a second user context, from a second user context to a third user context, etc. In some aspects, operation 410 utilizes machine learning techniques and/or statistical modeling techniques to determine the user context from the received enriched elements. Further, determined user patterns may be linked or associated with one or more specific user context to improve user context determinations.

After operation 410 is performed, operation 412 is performed during method 400. At operation 412 the formed or updated user centric memory graph and/or a determined user context is stored on a persistent memory and/or on a temporary memory. The out of date user centric memory graphs and/or user contexts may be stored and/or deleted. The stored current user centric memory graph may be provided during operation 408 in order to update the user centric memory graph based on the newly received or recently received enriched elements.

Next, at operation 414, the user centric memory graph is constrained based on the user context to form a constrained user centric memory graph. In some aspects, the user context includes a user query. In these aspects, the user centric memory graph is constrained based on the user query enriched elements and/or the user context to form a user query constrained memory graph at operation 414. The user centric memory graph is constrained by comparing the user context and/or user query enriched elements to the user centric memory graph during operation 414. Next, any elements of the current user context and/or enriched user query elements that match elements on the user centric memory graph based on the comparison are identified as relevant elements at operation 414. The contextual constrained memory graph is formed based on the relevant elements at operation 414. In other words, any elements on the user centric memory graph that were not identified as relevant elements are removed from the user centric memory graph to form the contextually constrained memory graph at operation 414.

After operation 414, operation 416 is performed. At operation 416 relevant elements on the contextually constrained memory graph are ranked based on the current user context to form ranked elements. In some aspects, the user context includes a user query enriched elements, third party enriched elements, a user pattern, and/or user feedback. In these embodiments, the ranking performed at operation 414 may be based one or more of the user query enriched elements, the third party enriched elements, the user pattern, and/or the user feedback of the user context. In some aspects, operation 416 utilizes a ranking algorithm to rank the relevant elements based on the current context.

Operation 402 collects user signals continuously, upon predetermine conditions, and/or after a predetermined amount of time. Each time new user signals are collected, the operation of method 400 have to be performed again in light of the newly received use signals. As such, new or updated user contexts, user centric memory graphs, user patterns, user feedback, and/or constrained memory graphs may be produced in response each newly received user signal during method 400.

In some aspects, method 400 includes operation 418. At operation 418 user specific memory information is sent to a third party. The memory elements may include the user context, the user centric memory graph, and/or the rankings of the relevant memory elements. In some aspects, the memory information is an abstraction layer of the user specific memory elements. The abstraction layer may include a query model. The third party may utilized the memory data for their own purposes, and/or provide feedback and/or provide enriched elements as user signals to operation 402.

After operation 416, operation 420 is performed. At operation 420 one or more responses based on the contextually constrained memory graph and/or the ranked elements is determined. In some aspects, one or more of the responses are an unrequested memory prompt. An unrequested memory prompt is contextually relevant information and/or recommendations provided to the user without user request. In other aspects, the one or more responses are answers to a received user query.

Next, operation 422 is performed. At operation 422 the relevancy of the one or more determined responses is determined. Each determined response is compared to a relevancy threshold at operation 422. If operation 422 determines that a response meets the relevancy threshold based on the comparison, operation 422 selects to perform operation 424. If operation 422 determines that a response does not meet the relevancy threshold based on the comparison, operation 422 selects to perform operation 402 again.

At operation 424 the determined response that meets the relevancy threshold is provided to a user. As discussed above, the response may be provided to one or more client computing devices for delivery to the user. In some aspects, the response is instructions to perform a given task or action. In some aspects, the response is automatically performed by a client computing device upon determination. In other aspects, the response is sent from a server computing device to one or more client computing devices 104 as instructions for performance by the client computing devices. In some aspects, the response is converted into phrases, words, and/or terms. In further aspects, the response provided to the user is sent to operation 402 as another user signal. In some aspects, the response is provided by displaying the response.

In some aspects, method 400 includes operation 426. At operation 426, user feedback is monitored or determined for the provided response. As discussed above, the user feedback may be implicit or explicit. Any determined user feedback is provided to operation 402 as an additional user signal at operation 426.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
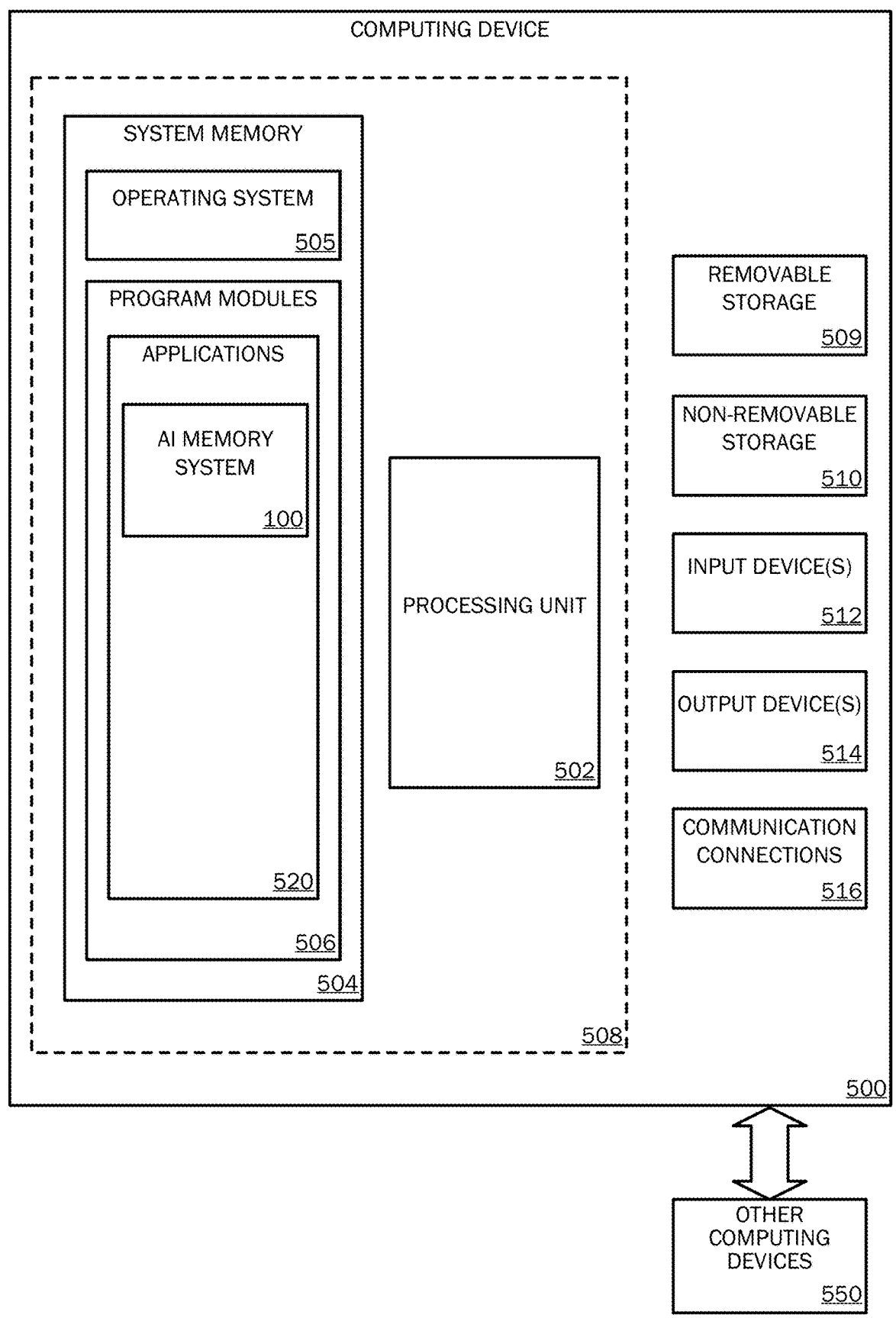
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the AI memory system 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the AI memory system 100 that can be executed to employ method 400 to build and/or use AI that models the human brain as disclosed herein.

Figure 7:
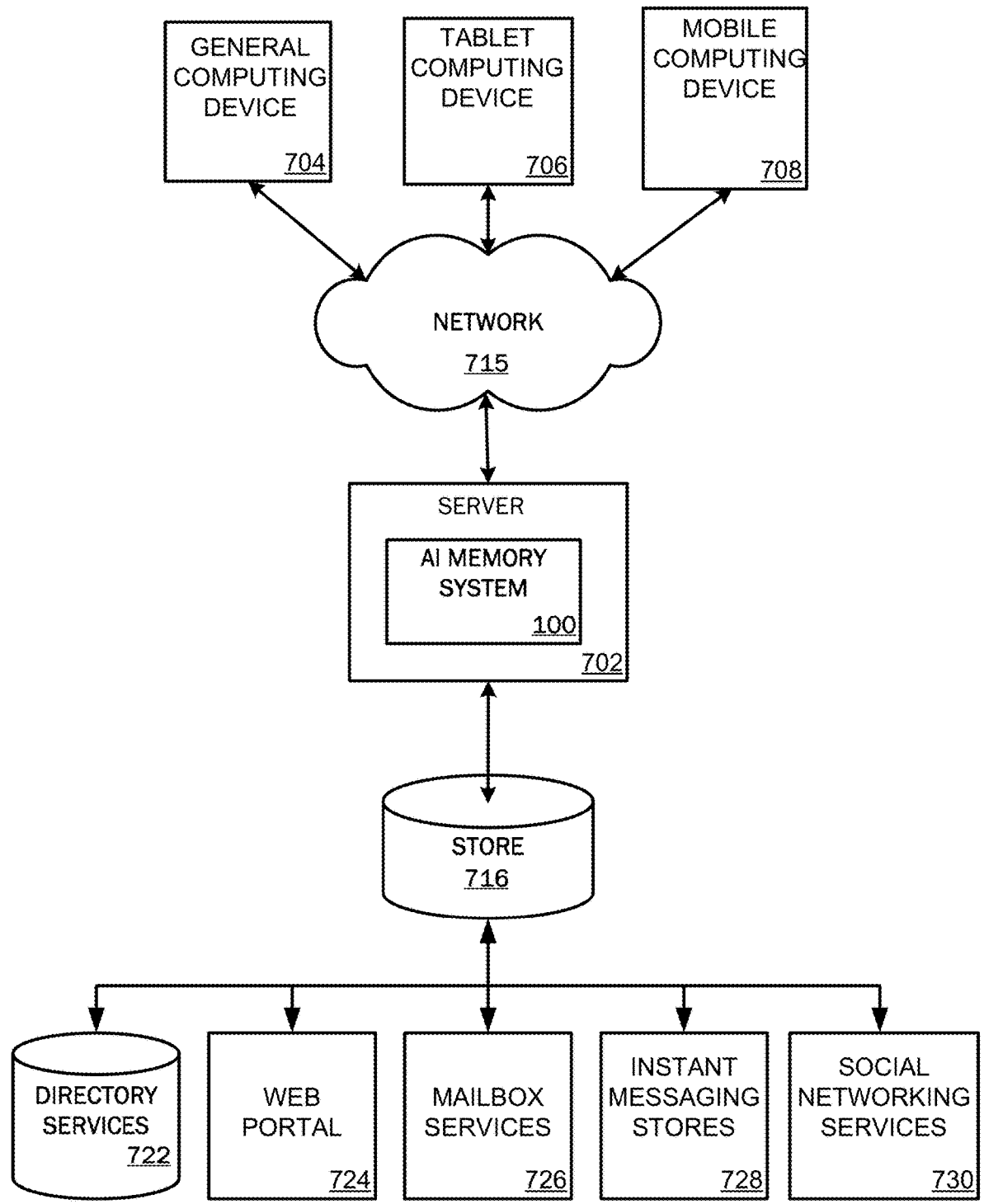
FIG. 7 is a simplified block diagram of a distributed computing system in which various aspects of the disclosure may be practiced.

In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 7 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., the AI memory system 100) may perform processes including, but not limited to, performing method 400 as described herein. For example, the processing unit 502 may implement the AI memory system 100. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the AI memory system 100 builds a user centric memory graph for one or more of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
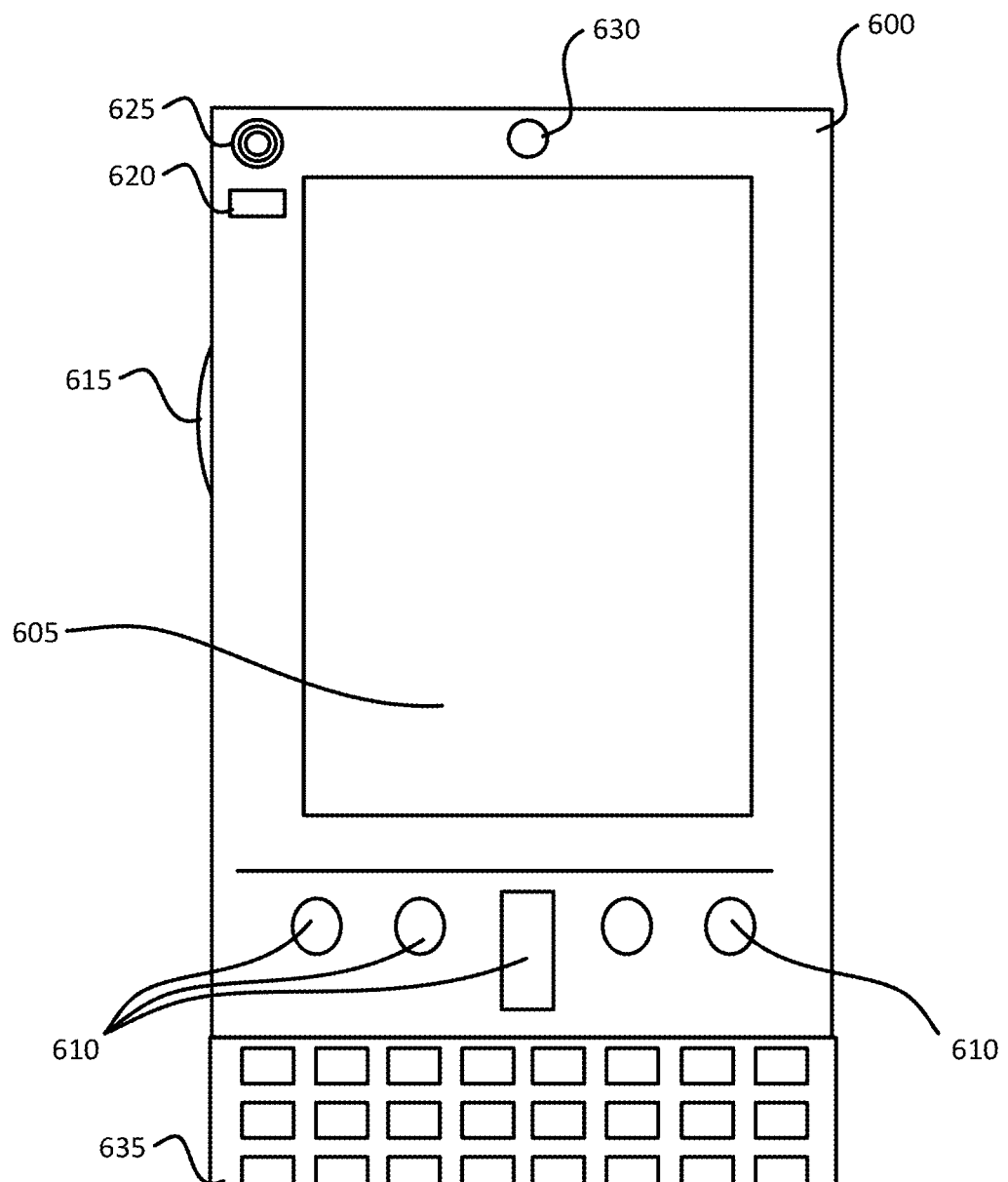
FIG. 6A is a simplified block diagram of a mobile computing device with which various aspects of the disclosure may be practiced.
Figure 6B:
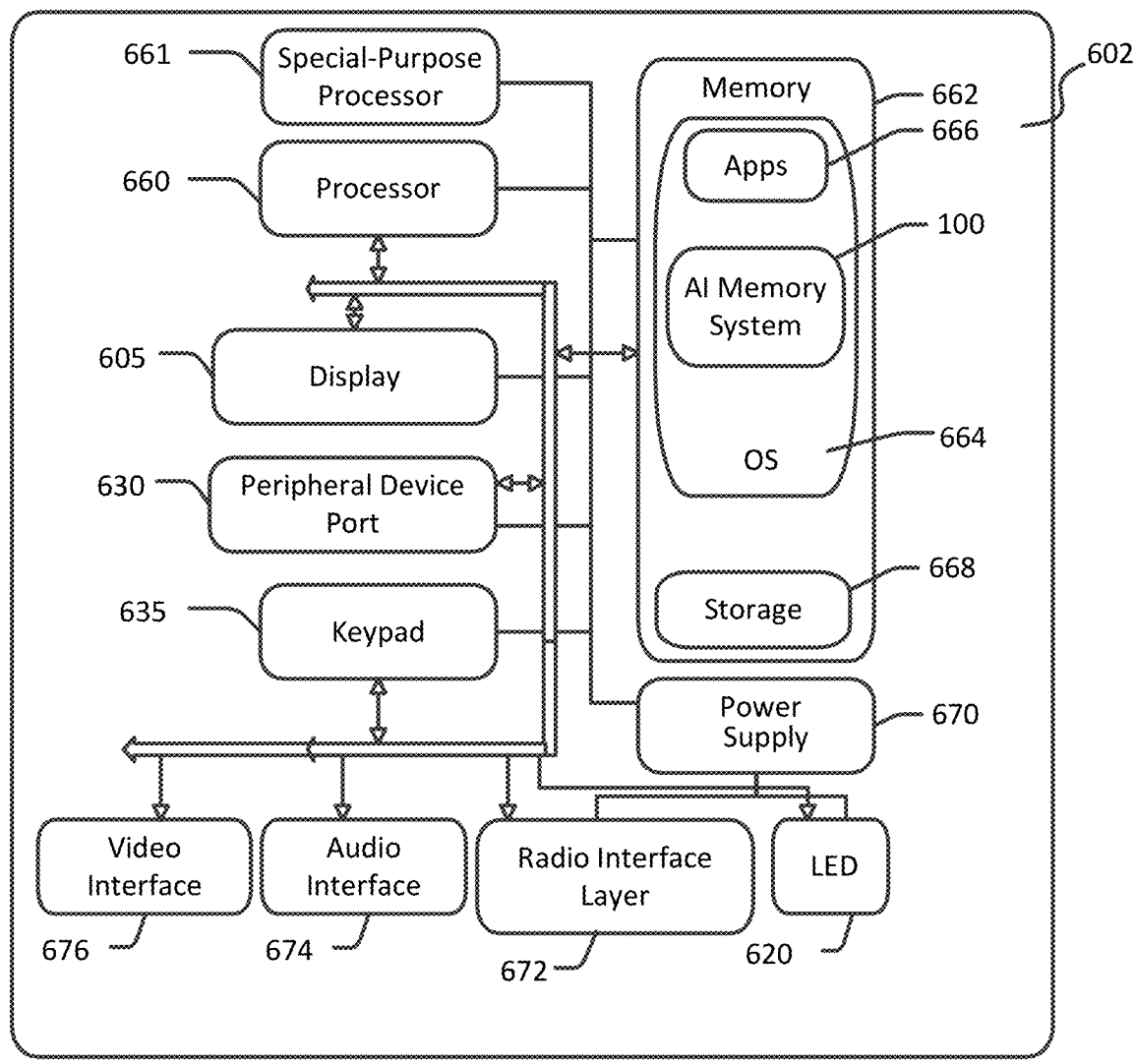
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI® port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666, the AI memory system 100 runs on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor(s) 660/661 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using store 716, a directory service 722, a web portal 724, a mailbox service 726, an instant messaging store 728, and/or a social networking site 730. By way of example, the AI memory system 100 may be implemented in a general computing device 704, a tablet computing device 706 and/or a mobile computing device 708 (e.g., a smart phone). In some aspects, the server 702 is configured to implement a AI memory system 100, via the network 715 as illustrated in FIG. 7.

Figure 8:
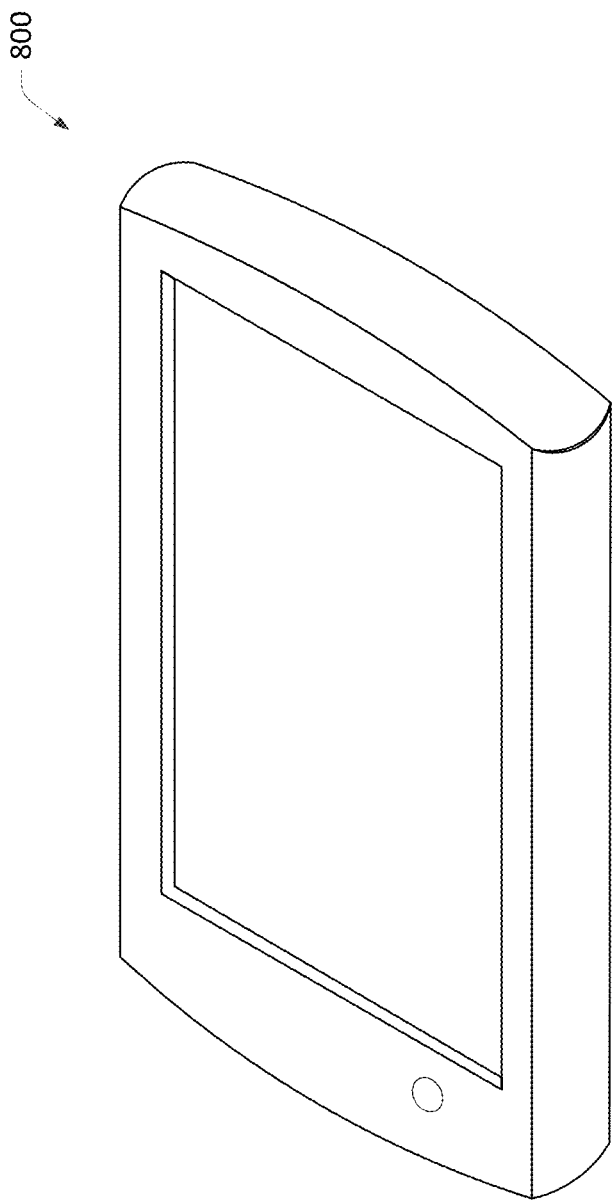
FIG. 8 illustrates a tablet computing device with which various aspects of the disclosure may be practiced

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific aspects disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various aspects disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for building and using an artificial intelligence memory system that models human memory for an application, the system comprising:
   at least one processor; and
   a memory for storing and encoding computer executable instructions that, when executed by the at least one processor, cause the system to be operative to perform operations, comprising:
   collect user signals that include a plurality of memory elements from a user;
   enrich the memory elements with world knowledge to form a plurality of enriched elements;
   determine relationships between two or more of the plurality of enriched elements, wherein the relationships are determined based on temporal data or spatial data associated with each of the two or more enriched elements;
   create a user centric memory graph by dynamically selecting and linking the plurality of enriched elements based on the determined relationships between the two or more enriched elements;
   determine a current user context at one of a time or a location;
   based on the determined current user context, dynamically identify and select a relevant subset of enriched elements having determined relationships that match the current user context within the plurality of enriched elements of the user centric memory graph;
   form a contextually constrained memory graph from the user centric memory graph based on the dynamic identification and selection of the relevant subset of enriched elements;
   rank the subset of enriched elements of the contextually constrained memory graph based on the current user context to form a ranked subset of enriched elements;
   determine an action based on querying the ranked subset of enriched elements of the contextually constrained memory graph, wherein querying the contextually constrained memory graph comprises querying fewer enriched elements than would be queried in the user centric memory graph; and
   perform the action.

2. The system of claim 1, wherein creating the user centric memory graph is performed by utilizing machine learning and statistical modeling techniques.

3. The system of claim 2, wherein the system is operative to perform further operations, comprising:
   analyze the user signals;
   determine a user pattern based on the analysis of the user signals; and
   add the user pattern to the user centric memory graph.

4. The system of claim 3, wherein the machine learning and statistical modeling techniques are updated based on the user pattern.

5. The system of claim 2, wherein the system is operative to perform further operations, comprising:
   receive user feedback to a provided response; and
   update the machine learning and statistical modeling techniques based on the user feedback, wherein the provided response is an unrequested memory prompt.

6. The system of claim 1, wherein the user context is one or more of a current user location, current time, current user digital behavior, or current user physical behavior.

7. The system of claim 1, wherein enriching the memory elements with the world knowledge to form the enriched elements comprises:
   converting digital artifacts in the user signals into the memory elements utilizing the world knowledge.

8. The system of claim 1, wherein the user signals include a user query, and wherein ranking the subset of enriched elements of the contextually constrained memory graph is further based on the user query to form the ranked elements.

9. The system of claim 1, wherein the application is a digital assistant application.

10. The system of claim 1, wherein the user signals are GPS coordinates, photos, browser history, emails, text messages, social data, user notes, to-do items, calendar items, professional data, events, and user application data.

11. The system of claim 1, wherein the system is operative to perform further operations, comprising:
   send the contextually constrained memory graph to a third party;
   receive third party enriched memory data in new user signals from the third party based on the contextually constrained memory graph; and
   update the user centric memory graph based on the third party enriched memory data.

12. A system for building an artificial intelligence memory system that models human memory for an application, the system comprising:
   at least one processor; and
   a memory for storing and encoding computer executable instructions that, when executed by the at least one processor, cause the system to be operative to perform operations, comprising:
   collect user signals that include digital artifacts;
   convert the digital artifacts into a set of memory elements utilizing world knowledge;
   enrich the set of memory elements with the world knowledge to form a set of enriched elements;
   determine a relationship between each enriched element and at least one other enriched element to determine a plurality of relationships, wherein each relationship of the plurality of relationships is determined based on temporal data or spatial data associated with each enriched element of the set of enriched elements;
   create a user centric memory graph by dynamically selecting and linking each enriched element of the set of enriched elements based on the plurality of relationships utilizing machine learning and statistical modeling techniques;
   determine a current user context at one of a time or a location;
   based on the current user context, dynamically identify and select a relevant subset of enriched elements having determined relationships that match the current user context within the plurality of enriched elements of the user centric memory graph;
   form a contextually constrained memory graph from the user centric memory graph based on the dynamic identification and selection of the relevant subset of enriched elements, wherein the contextually constrained memory graph includes the relevant subset of enriched elements resulting in fewer than the plurality of enriched elements of the user centric memory graph; and determine, at least one of an unrequested memory prompt or a response by querying the contextually constrained memory graph based on the current user context, wherein querying the contextually constrained memory graph comprises querying fewer enriched elements than would be queried in the user centric memory graph.

13. The system of claim 12, wherein the system is operative to perform further operations, comprising:
analyze the user signals;
determine a user pattern based on the analysis of the user signals; and
update the machine learning and statistical modeling techniques based on the user pattern.

14. The system of claim 12, wherein the system is operative to perform further operations, comprising:
receive user feedback in the user signals; and
update the machine learning and statistical modeling techniques based on the user feedback.

15. A method for using an artificial intelligence memory system that models human memory, the method comprising:
collecting user signals that include digital artifacts;
converting the digital artifacts into a plurality of memory elements utilizing world knowledge;
enriching the plurality of memory elements with the world knowledge to form a plurality of enriched elements;
determining relationships between two or more of the plurality of enriched elements, wherein the relationships are determined based on spatial data or temporal data associated with each of the two or more enriched elements;
updating a user centric memory graph by dynamically selecting and linking the plurality of enriched elements based on the relationships in at least one of space, time, and cognitive dimensions between the plurality of enriched elements;
determining a first user context at one of a first time or a first location;
based on the determined first user context, dynamically identifying and selecting a relevant subset of enriched elements having determined relationships that match the current user context within the plurality of enriched elements of the updated user centric memory graph;
forming a contextually constrained memory graph from the user centric memory graph based on the dynamic identification and selection of the relevant subset of enriched elements, wherein the contextually constrained memory graph includes the relevant subset of enriched elements resulting in fewer than the plurality of enriched elements of the user centric memory graph;
ranking the subset of enriched elements of the contextually constrained memory graph based on the first user context to form a ranked subset of enriched elements utilizing a ranking algorithm;
determining an unrequested memory prompt based on querying the ranked subset of enriched elements of the contextually constrained memory graph, wherein querying the contextually constrained memory graph comprises querying fewer enriched elements than would be queried in the user centric memory graph;
comparing the unrequested memory prompt to a relevancy threshold;
determining that the unrequested memory prompt meets the relevancy threshold based on the comparing; and
in response to the determining that the unrequested memory prompt meets the relevancy threshold, providing the unrequested memory prompt to a client computing device.

16. The method of claim 15, further comprising:
sending the unrequested memory prompt to a third party;
receiving an enriched third party memory elements from the third party based on the unrequested memory prompt; and
in further response to the determining that the unrequested memory prompt meets the relevancy threshold, sending instructions to the client computing device to provide the enriched third party memory elements to the user.

17. The method of claim 15, further comprising:
analyzing the enriched elements;
determining a user pattern based on the analyzing of the enriched elements;
updating the machine learning and statistical modeling techniques based on the user pattern; and
updating the updated user centric memory graph based on the user pattern.

18. The method of claim 15, further comprising:
receiving new user signals including a user query;
enriching the user query utilizing the world knowledge to form enriched user query elements;
updating the updated user centric memory graph by linking the enriched user query elements based on the relationships created in the space, the time, and the cognitive dimensions utilizing the machine learning and statistical modeling techniques to form a new updated user centric memory graph;
storing the new updated user centric memory graph;
determining a second user context based on the enriched user query elements;
identifying a new subset of enriched elements of the updated user centric memory graph based on the enriched user query elements to form a query constrained memory graph;
ranking the new subset of enriched elements on the query constrained memory graph based on the enriched user query elements to form new ranked subset of enriched elements utilizing the ranking algorithm;
determining a requested response based the query constrained memory graph and the new ranked subset of enriched elements;
determining that the requested response meets the relevancy threshold; and
providing the requested response to the user upon determining that the requested response meets the relevancy threshold.

19. The method of claim 18, wherein identifying the new subset of enriched elements on the updated user centric memory graph is further based on the second user context, and wherein ranking the new subset of enriched elements on the query constrained memory graph is further based on the second user context.

20. The method of claim 15, wherein the contextually constrained memory graph links the subset of enriched elements based on the relationships created in the space, the time, and the cognitive dimensions.

* * * * *